United States Patent
Tsuruta

(10) Patent No.: US 6,992,454 B2
(45) Date of Patent: Jan. 31, 2006

(54) MOTOR CONTROLLER AND METHOD FOR MEASURING CHARACTERISTICS OF MECHANISM

(75) Inventor: Kazuhiro Tsuruta, Fukuoka (JP)

(73) Assignee: Kabushiki Kaisha Yaskawa Denki, Fukuoka (JP)

(*) Notice: Subject to any disclaimer, the term of this patent is extended or adjusted under 35 U.S.C. 154(b) by 0 days.

(21) Appl. No.: 10/474,025

(22) PCT Filed: Mar. 28, 2002

(86) PCT No.: PCT/JP02/03047
§ 371 (c)(1),
(2), (4) Date: Apr. 20, 2004

(87) PCT Pub. No.: WO02/082202
PCT Pub. Date: Oct. 17, 2002

(65) Prior Publication Data
US 2004/0179831 A1    Sep. 16, 2004

(30) Foreign Application Priority Data
Apr. 4, 2001    (JP)    ............................. 2001-105820

(51) Int. Cl.
*G05B 13/00*    (2006.01)
(52) U.S. Cl. .................. 318/561; 318/466; 318/436
(58) Field of Classification Search ............... 318/561, 318/466
See application file for complete search history.

(56) References Cited

U.S. PATENT DOCUMENTS

| | | | |
|---|---|---|---|
| 6,198,246 B1 | 3/2001 | Yutkowitz | |
| 6,211,640 B1 * | 4/2001 | Fujisaki et al. | ............. 318/636 |
| 6,285,972 B1 * | 9/2001 | Barber | ........................... 703/8 |
| 6,622,099 B2 * | 9/2003 | Cohen et al. | .................. 702/75 |
| 6,822,415 B1 * | 11/2004 | Komiya et al. | ............. 318/629 |
| 2002/0022903 A1 * | 2/2002 | Krah et al. | .................. 700/170 |

FOREIGN PATENT DOCUMENTS

| | | |
|---|---|---|
| CN | 1254420 A | 5/2000 |
| EP | 1 180 734 A1 | 2/2002 |
| JP | 61-88780 A | 5/1986 |
| JP | 4-118703 A | 4/1992 |
| JP | 6-70566 A | 3/1994 |
| JP | 10-56790 A | 2/1998 |
| JP | 10-254550 A | 9/1998 |
| JP | 11-119804 A | 4/1999 |
| JP | 2000-197382 A | 7/2000 |
| JP | 2000-217378 A | 8/2000 |

* cited by examiner

Primary Examiner—David Martin
Assistant Examiner—Christopher P. Heinrichs
(74) Attorney, Agent, or Firm—Sughrue Mion, PLLC

(57) ABSTRACT

A detector (20) detects the position of a motor, and a differentiator (26) calculates the speed of the motor from the position of the motor. An command generation section (11) fixes a position command to a current position. A position control section (12) generates a speed command such that the position command matches the position of the motor. A speed control section (13) generates such a torque command that the speed command coincides with the speed of the motor. An adder (16) adds a high-speed sweep waveform generated by a random signal generation section (15) as torque random to a torque command output from a torque filter section (14), thereby outputting a new torque command. A current control section (17) converts the torque command into a current command, thereby driving a motor (18). A frequency response measurement section (21) receives a torque command output from the adder (16) and a motor speed calculated by a differentiator (26) and measures a frequency response.

12 Claims, 6 Drawing Sheets

MOTOR CONTROLLER AND METHOD FOR MEASURING CHARACTERISTICS OF MECHANISM

FIELD OF THE INVENTION

The present invention relates to a motor controller for controlling a motor, a robot, or a machine tool, and more particularly, to a mechanism characteristic measurement method for measuring a frequency characteristic of a mechanism connected to a motor and a mechanism characteristic including inertia of a chassis section.

BACKGROUND ART

When a motor, a robot, a machine tool, or the like is controlled by means of a motor controller, a chassis section is connected to a motor. Therefore, measurement of a frequency characteristic of the chassis section connected to the motor and measurement of a mechanism characteristic including inertia of the chassis section are required.

A method for measuring the frequency characteristic of the chassis section includes a method (first related-art method) under which a high-speed sweep waveform is input as a torque command and there is measured a frequency response while the torque command is taken as an input and a motor speed is taken as an output; and a method (second related-art method) under which a high-speed sweep waveform is input as a speed command and there is measured a frequency response while the speed command is taken as an input and a motor speed is taken as an output.

First, the configuration of the motor controller for measuring the frequency characteristic of the chassis section through use of the first related-art method will now be described by reference to FIG. 1.

The related-art motor controller is constituted of a random signal generation section 15, a current control section 17, a detector 20, a differentiator 26, and a frequency response measurement section 27. The motor controller measures a frequency characteristic of a motor 18 connected to a chassis section 19.

The random signal generation section 15 generates and outputs a high-speed sweep waveform. The current control section 17 receives the high-speed sweep waveform output from the random signal generation section 15 as a torque command, converts the torque command into a current command, and controls an electric current such that the electric current supplied to the motor 18 matches the thus-converted current command, thereby driving the motor 18. The detector 20 detects a rotational position of a rotary shaft by means of being coupled to the rotary shaft of the motor 18 or the like. The differentiator 26 calculates a motor speed from the signal output from the detector 20. The frequency response measurement section 27 measures a frequency response by receiving the torque command output from the random signal generation section 15 and the motor speed calculated by the differentiator 26.

Next, the configuration of the motor controller for measuring the frequency characteristic of the chassis section through use of the second related-art method will now be described by reference to FIG. 2.

The related-art motor controller is constituted of the random signal generation section 15, a speed control section 13, a torque filter section 14, the current control section 17, the detector 20, the differentiator 26, and the frequency response measurement section 27. The motor controller measures a frequency characteristic of the motor 18 connected to the chassis section 19, as in the case of the motor controller shown in FIG. 1. In FIG. 2, those constituent elements which are the same as those shown in FIG. 1 are assigned the same reference numerals, and explanations thereof are omitted.

The speed control section 13 receives an output from the random signal generation section 15 as a speed command and performs speed control operation by generating such a torque command that the motor speed calculated by the differentiator 26 matches the speed command. The torque filter section 14 receives the torque command from the speed control section 13, thereby performing filtering operation through use of a low-pass filter or the like.

The current control section 17 employed in the second related-art method receives the torque command output from the torque filter section 14, converts the torque command into a current command, and performs current control operation such that the current supplied to the motor 18 matches the current command, thereby driving the motor 18.

The frequency response measurement section 27 employed in the second related-art method also measures a frequency response by receiving the speed command output from the random signal generation section 15 and the motor speed calculated by the differentiator 26, as in the case of the related-art motor controller shown in FIG. 1.

According to the previously-described first and second related-art methods, the frequency characteristic of the chassis section 19 connected to the motor 18 can be measured.

However, according to the first related-art method, a position loop and a speed loop are not constituted. Hence, the measurement is susceptible to random force attributable to gravity and random attributable to a frictional characteristic of the mechanism. For these reasons, in some cases, a displacement arises in the position of the motor before and after measurement of the frequency characteristic. The method requires processing for returning the position of the motor to an initial position after measurement of a frequency response, or protective means for aborting measurement of a frequency characteristic when the position of the motor has become displaced over a certain amount or more. Further, when the amount of positional displacement has become greater, there also arises a problem of the motor falling outside a movable range of the mechanism.

According to the second related-art method, occurrence of positional displacement can be essentially prevented, because a speed loop is constituted. However, since the torque command is determined so as to match the high-speed sweep waveform input as a speed command, the torque command becomes greater as a frequency of the speed command becomes higher. Eventually, torque saturation arises. In this case, measurement of the frequency response may become impossible, and there is also the risk of destruction of the motor or mechanism. If measures, such as a reduction in a speed loop gain, are taken, occurrence of such a problem can be avoided. However, if the speed loop gain is made small, the response of the speed loop will become slow, thereby presenting a problem of the inability to accurately measure the frequency characteristic of the mechanism. Further, the high-speed sweep waveform is used as a speed command, and hence the characteristic of the speed loop affects the frequency response, thereby presenting a problem of a failure to acquire an accurate frequency characteristic.

A method for identifying inertia through use of a device differing from that used for measuring a frequency characteristic has hitherto been available as a method for identifying inertia.

For instance, JP-A-61-88780 describes a device which calculates the result of integration of a torque command and the range of variation in rotational speed by changing the torque command to change the rotational speed and identifies inertia through calculatcalculation of (inertia)=(the result of integration of a torque command)/(the range of change in rotational speed). JP-A-6-70566 describes a device which inputs a speed command having a ramp section to subject a speed loop to P control (proportional control), thereby identifying load inertia from a ratio of a stationary speed variation achieved when there is no load inertia and a stationary speed variation achieved when there is load inertia.

Inertia compensation for correcting the inertia of a motor is performed through use of the inertia identified by means of such a method. Specifically, compensation of inertia is performed by previously multiplying an output of speed command by the inverse of inertia of the motor.

DISCLOSURE OF THE INVENTION

An object of the invention is to provide a motor controller and a mechanism characteristic measurement method, which enable accurate measurement of a frequency response of a mechanism without involvement of positional displacement or torque saturation.

Another object of the invention is to provide a mechanism characteristic measurement method which simultaneously enables measurement of a frequency characteristic and identification of inertia.

To solve the problems, a motor controller of the invention includes a detector for detecting the position of a motor;

a differentiator for calculating the speed of the motor from the position of the motor detected by the detector;

an command generation section which outputs a position command and produces an output by fixing the position command to a current position when a characteristic of a mechanism is measured;

a position control section which receives a position command output from the command generation section and performs position control operation by generating a speed command such that the position command matches the position of the motor;

a speed control section for performing speed control operation by generating such a torque command that the speed command coincides with the speed of the motor;

a torque filter section for subjecting the torque command to filtering;

a random signal generation section for generating and outputting torque random;

an adder which adds torque random generated by the random signal generation section to a torque command output from the torque filter section, thereby outputting the obtained signal as a new torque command;

a current control section which receives a torque command output from the adder, converts the torque command into a current command, and performs current control such that an electric current supplied to the motor coincides with the current command, thereby driving the motor; and a frequency response measurement section which receives a torque command output from the adder and a motor speed calculated by the differentiator and measures a frequency response.

The invention enables measurement of a frequency response without involvement of positional displacement and torque saturation and accurate measurement of a frequency response without undergoing the influence of a position loop and a speed loop, by means of adding torque random to a torque command while the position loop and the speed loop are configured and measuring a frequency response arising between a torque command to which torque random is added and the speed of the motor.

In the motor controller of the invention, the torque random may be embodied by a high-speed sweep waveform or a maximum length code signal.

Further, a mechanism characteristic measurement method of the invention is a mechanism characteristic measurement method for measuring a characteristic of a mechanism in a motor controller, the controller including a detector for detecting the position of a motor, a differentiator for calculating the speed of the motor from the position of the motor detected by the detector, an command generation section for outputting a position command, a position control section which receives a position command output from the command generation section and performs position control operation by generating a speed command such that the position command matches the position of the motor, a speed control section for performing speed control operation by generating such a torque command that the speed command coincides with the speed of the motor, a torque filter section for subjecting the torque command to filtering, and a current control section which receives a torque command output from the torque filter section, converts the torque command into a current command, and performs current control such that an electric current supplied to the motor coincides with the current command, thereby driving the motor, the method comprising:

a step of fixing a position command output from the command generation section to a current position;

a step of taking, as a new torque command, a signal formed by adding torque random to a torque command output from the torque filter section; and a step of measuring a frequency characteristic by receiving a torque command to which the torque random is added and a motor speed calculated by the differentiator.

The present invention enables measurement of a frequency response without involvement of positional displacement and torque saturation and accurate measurement of a frequency response without undergoing the influence of a position loop and a speed loop, by means of adding torque random to a torque command while the position loop and the speed loop are configured and measuring a frequency response arising between a torque command to which torque random is added and the speed of the motor.

Another mechanism characteristic measurement method of the invention may further include a step of previously determining a frequency characteristic of an individual motor; and a step of calculating a total amount of inertia including inertia of a chassis section by comparing the frequency characteristic of the individual motor with the measured frequency characteristic.

According to the mechanism characteristic measurement method of the invention, inertia is identified by fixing a position command to a current position. Hence, inertia can be identified without involvement of a change in the position of the motor. Further, inertia can be identified easily from the thus-obtained frequency characteristic, and hence there can be obviated a necessity for an independent device to be used for identifying inertia.

According to another mechanism characteristic measurement method of the invention, the step of calculating a total amount of inertia may include a step of calculating a difference between gains at respective frequencies by comparing gains achieved at a plurality of frequencies of the frequency characteristic of the individual motor with gains achieved at a plurality of frequencies of the measured frequency characteristic;

a step of calculating a mean difference between the gains achieved at the respective frequencies; and a step of calculating the total amount of inertia by means of specifying the total amount of inertia, including the inertia of the chassis section, in terms of integral multiples of the inertia of the individual motor.

The frequency characteristic of the individual motor may be measured through use of a controller model determined by simulation of the motor controller or by measurement of a frequency characteristic while the chassis section is removed from the motor in the motor controller.

BEST MODES FOR IMPLEMENTING THE INVENTION

Modes for implementing the invention will now be described in detail by reference to the drawings.

Figure 3:
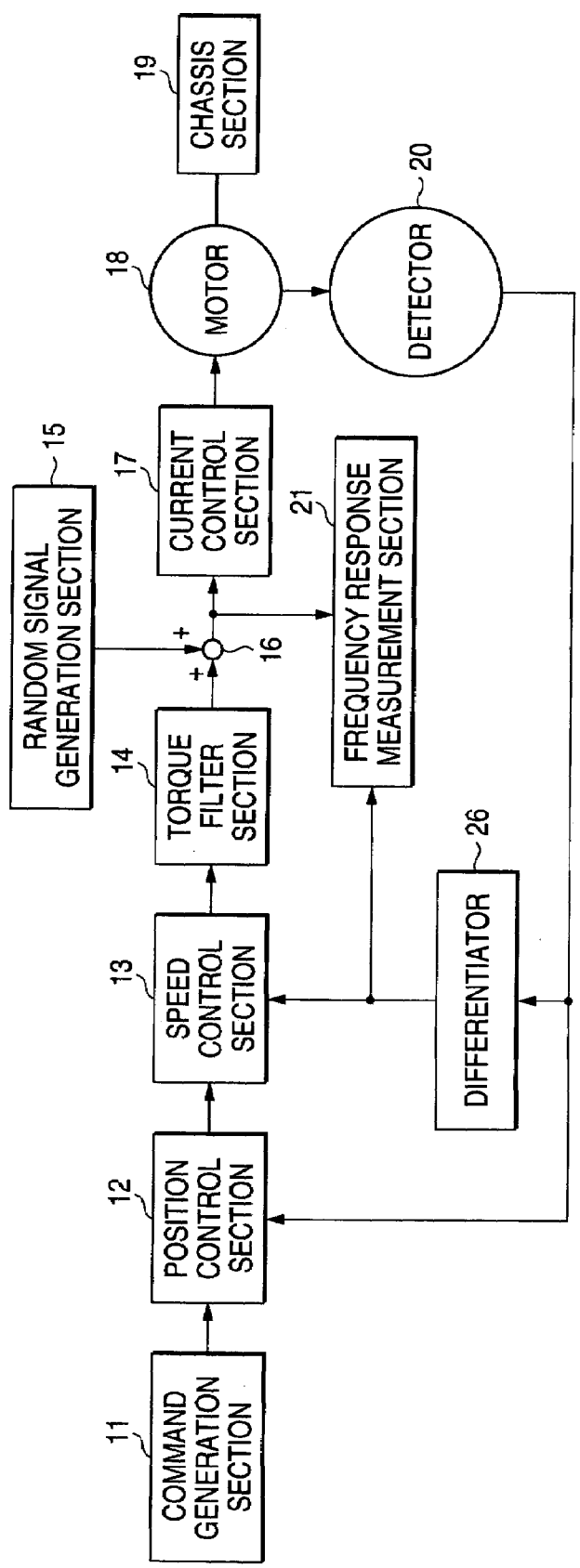
FIG. 3 is a block diagram showing the configuration of a motor controller for implementing a mechanism characteristic measurement method according to an embodiment of the invention.

FIG. 3 is a block diagram showing the configuration of a motor controller to which a mechanism characteristic measurement method according to an embodiment of the invention is applied.

Figure 1:
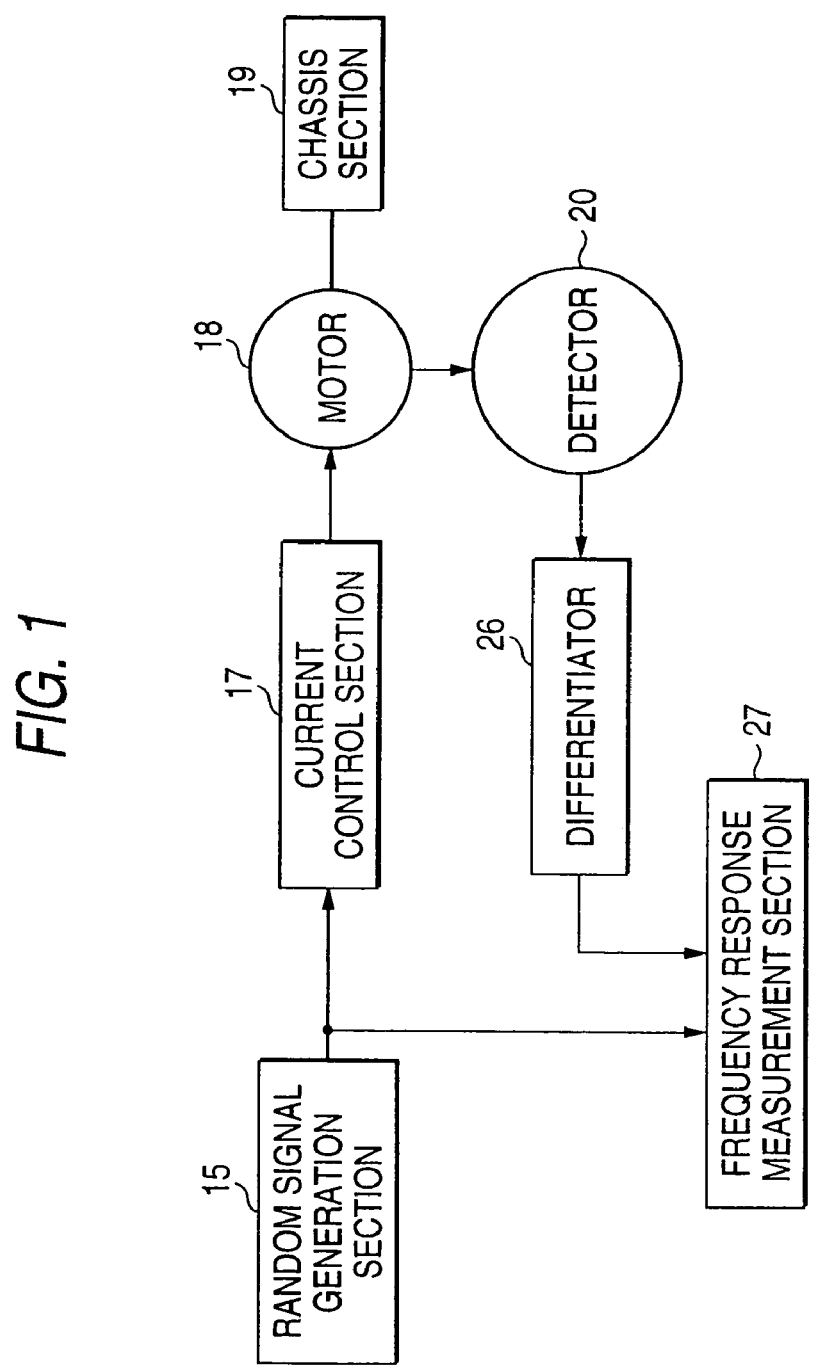
FIG. 1 is a block diagram showing the configuration of a motor controller to which a first related-art method is applied.
Figure 2:
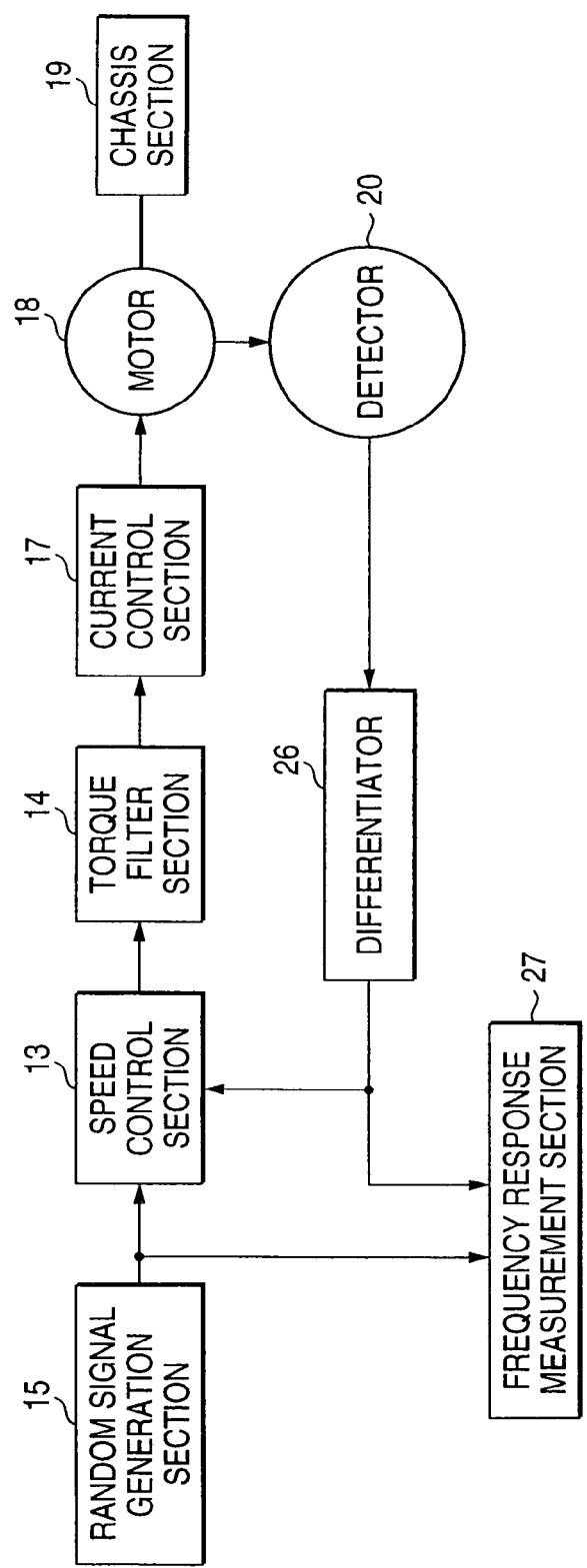
FIG. 2 is a block diagram showing the configuration of a motor controller to which a second related-art method is applied.

As shown in FIG. 3, the motor controller of the embodiment comprises an command generation section 11; a position control section 12; a speed control section 13; a torque filter section 14; a random signal generation section 15; an adder 16; and a current control section 17 and measures a frequency characteristic of a motor 18 connected to a chassis section 19. In FIG. 3, those constituent elements which are the same as those shown in FIGS. 1 and 2 are assigned the same reference numerals, and their explanations are omitted.

The command generation section 11 outputs a position command. When the characteristic of a mechanism is measured, the command generation section produces an output by fixing the position command to a current position. The position control section 12 performs position control by means of receiving a position command output from the command generation section 11 and the position of the motor 18 detected by the detector 20 and generating a speed command such that the two positions coincide with each other.

The speed control section 13 controls the speed of the motor 18 by means of receiving the speed command output from the position control section 12 and the speed of the motor 18 calculated by the differentiator 26 and generating such a torque command that the speed command output from the position control section 12 coincides with the speed of the motor 18 calculated by the differentiator 26. The adder 16 adds the high-speed sweep waveform generated by the random signal generation section 15 as torque random to the torque command output from the torque filter section 14, thereby outputting a resultantly-obtained signal as a new torque command.

The current control section 17 of the embodiment converts the torque command output from the adder 16 into a current command and controls an electric current such that the detected motor current coincides with the current command, thereby supplying the electric current to the motor 18. The frequency response measurement section 21 measures a frequency response by receiving a torque command output from the adder 16 and the motor speed calculated by the differentiator 26.

Figure 4:
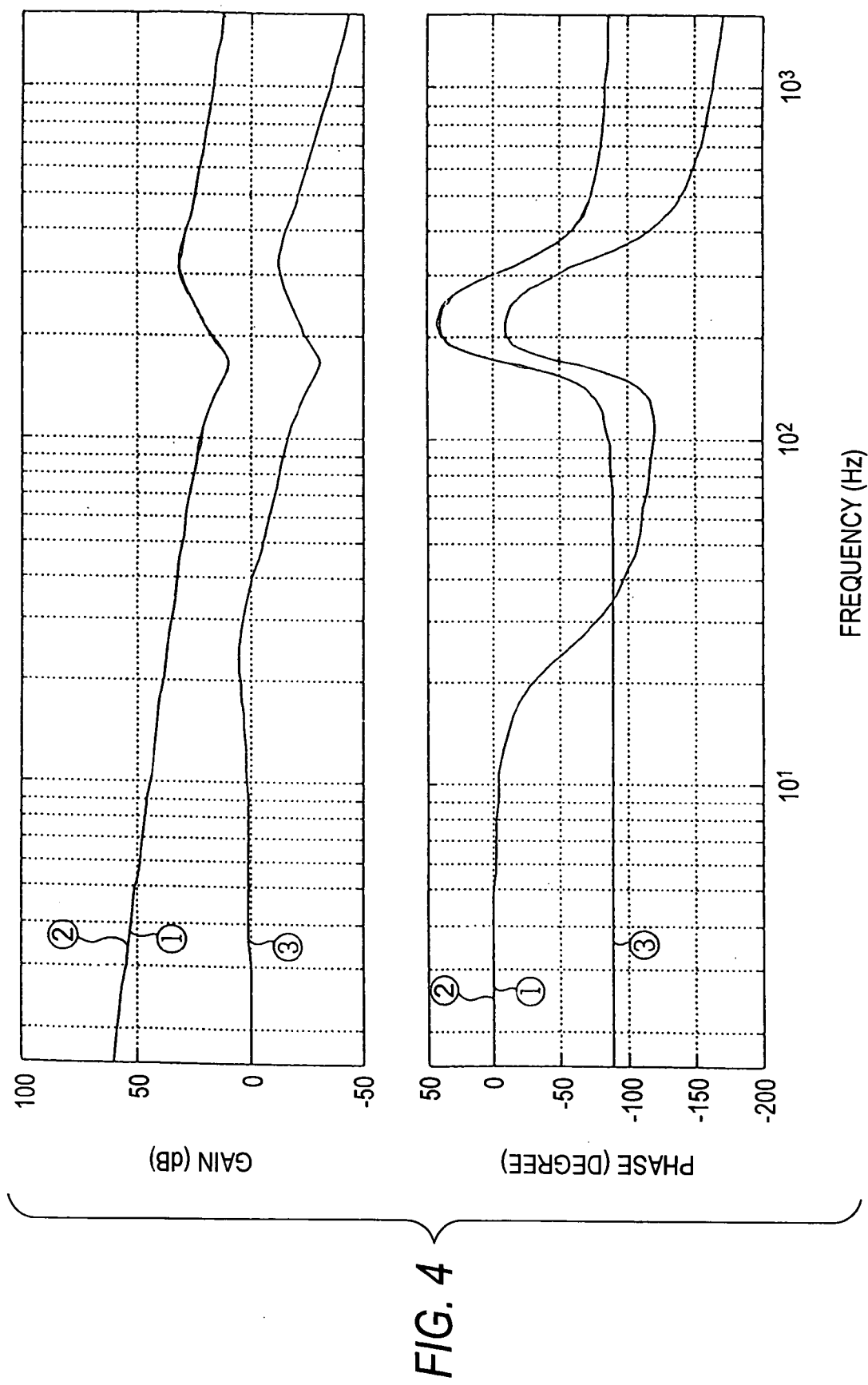
FIG. 4 is a view showing a result of measurement of a frequency response through simulation.

Next, FIG. 4 shows results of simulation of a frequency response performed by means of the mechanism characteristic measurement method of the embodiment, that performed by means of the first related-art method, and that performed by means of the second related-art method. FIG. 4 shows a gain diagram showing a frequency characteristic, and a board diagram formed from a phase diagram. In FIG. 4, (1) designates a graph of a frequency characteristic obtained by means of a mechanism characteristic method according to the embodiment; (2) designates a graph of a frequency characteristic obtained by means of the first related-art method; and (3) designates a graph of a frequency characteristic obtained by the second related-art method. In FIG. 4, the graphs shown in (1) and (2) substantially coincide with each other and overlap each other. Under any of the methods, an antiresonant frequency and a resonance frequency coincide with a preset mechanism characteristic.

According to the mechanism characteristic measurement method of the embodiment, a frequency response is measured by configuring a position loop. Hence, no positional displacement arises. Operation can be performed under another driving requirement immediately after measurement of a frequency response. Since the high-speed sweep waveform is input as torque random, a torque command essentially identical with the magnitude of the high-speed sweep waveform is calculated, and hence torque saturation does not arise. For this reason, according to the mechanism characteristic measurement method of the embodiment, a frequency characteristic can be measured without involvement of positional displacement and torque saturation.

Although, according to the embodiment, the speed loop is constituted, the high-speed sweep waveform is input not as a speed command but as torque random, and a frequency characteristic is measured through use of a new torque command determined by adding torque random to a torque command output from the speed loop and through use of the speed of the motor. Hence, the characteristic of the speed loop does not affect the frequency response, and an accurate frequency characteristic can be obtained.

Next, an inertia identification method for identifying inertia of the motor 18 including inertia of the chassis section 19 will now be described by means of the mechanism characteristic measurement method of the embodiment.

According to the mechanism characteristic measurement method of the embodiment, the frequency characteristic of the individual motor is determined beforehand through use of the controller model. Inertia is identified by comparing the frequency characteristic of the individual motor with the frequency characteristic actually measured by the motor controller.

Figure 5:
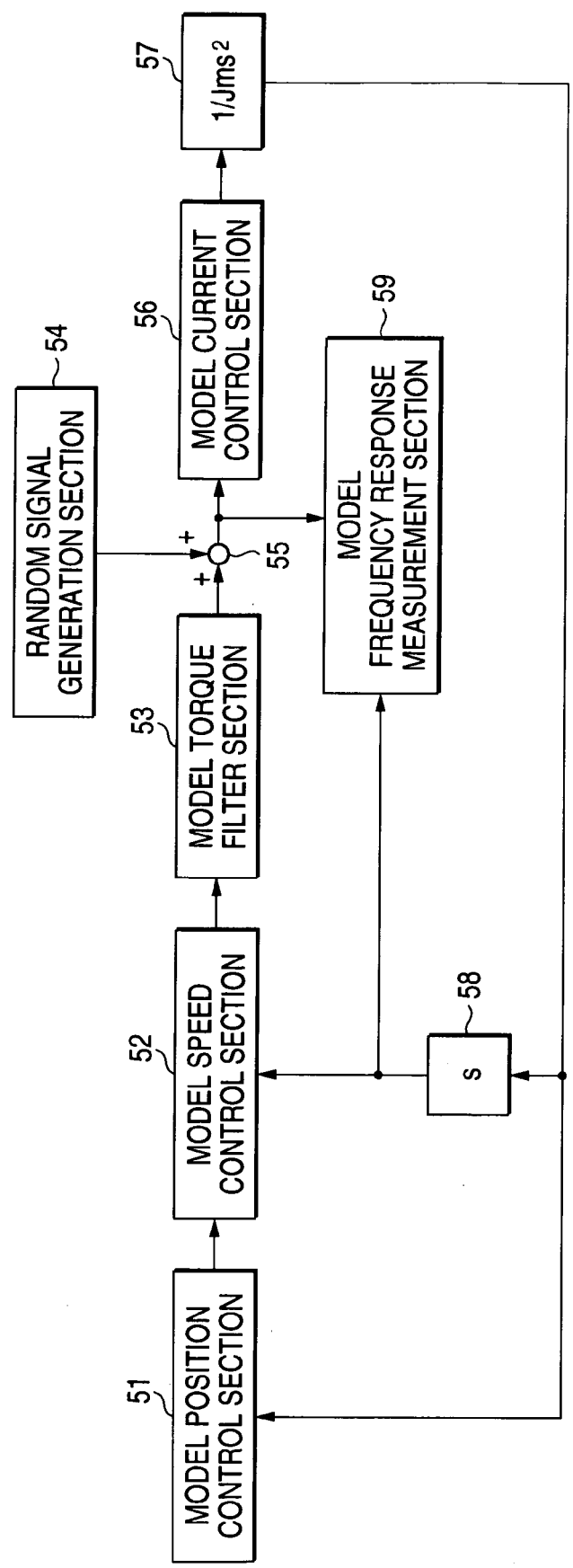
FIG. 5 is a block diagram for describing the configuration of a controller model.

Here, the controller model is a simulation of an actual motor controller. In the controller model, a chassis section is taken as a rigid body. The configuration of the controller model is described by reference to FIG. 5.

The controller model is constituted of a model position control section 51, a model speed control section 52, a model torque filter section 53, a random signal generation section 54, an adder 55, a model current control section 56, a motor model 57 represented by an individual motor, a differentiator 58, and a model frequency response measurement section 59.

The model position control section 51 performs position control operation by means of generating and outputting such a speed command that the output position of the motor model 57 is reset to a zero position. The model speed control section 52 performs speed control operation by means of producing and outputting a torque command such that a speed command output from the model position control section 51 coincides with the speed signal output from the differentiator 58. The model torque filter section 53 inputs the torque command output from the model speed control section 52, thereby performing filtering operation. The random signal generation section 54 generates and outputs a high-speed sweep waveform.

The adder 55 outputs a new torque command by adding a high-speed sweep waveform output from the random signal generation section 54 to the torque command output from the model torque filter section 53. The model current control section 56 converts the torque command output from the adder 55 into a current command so as to perform such current control that the detected motor current coincides with the current command, thereby driving the motor model 57. The model frequency response measurement section 59 measures a frequency response by receiving the torque command output from the adder 55 and the motor speed.

Frequency characteristics of the individual motor and frequency characteristics achieved in case where the inertia of the motor model 57 is made twice, four times, and eight times that of an individual motor are determined by use of the controller model through simulation. Simulation results are shown in FIG. 6.

Figure 6:
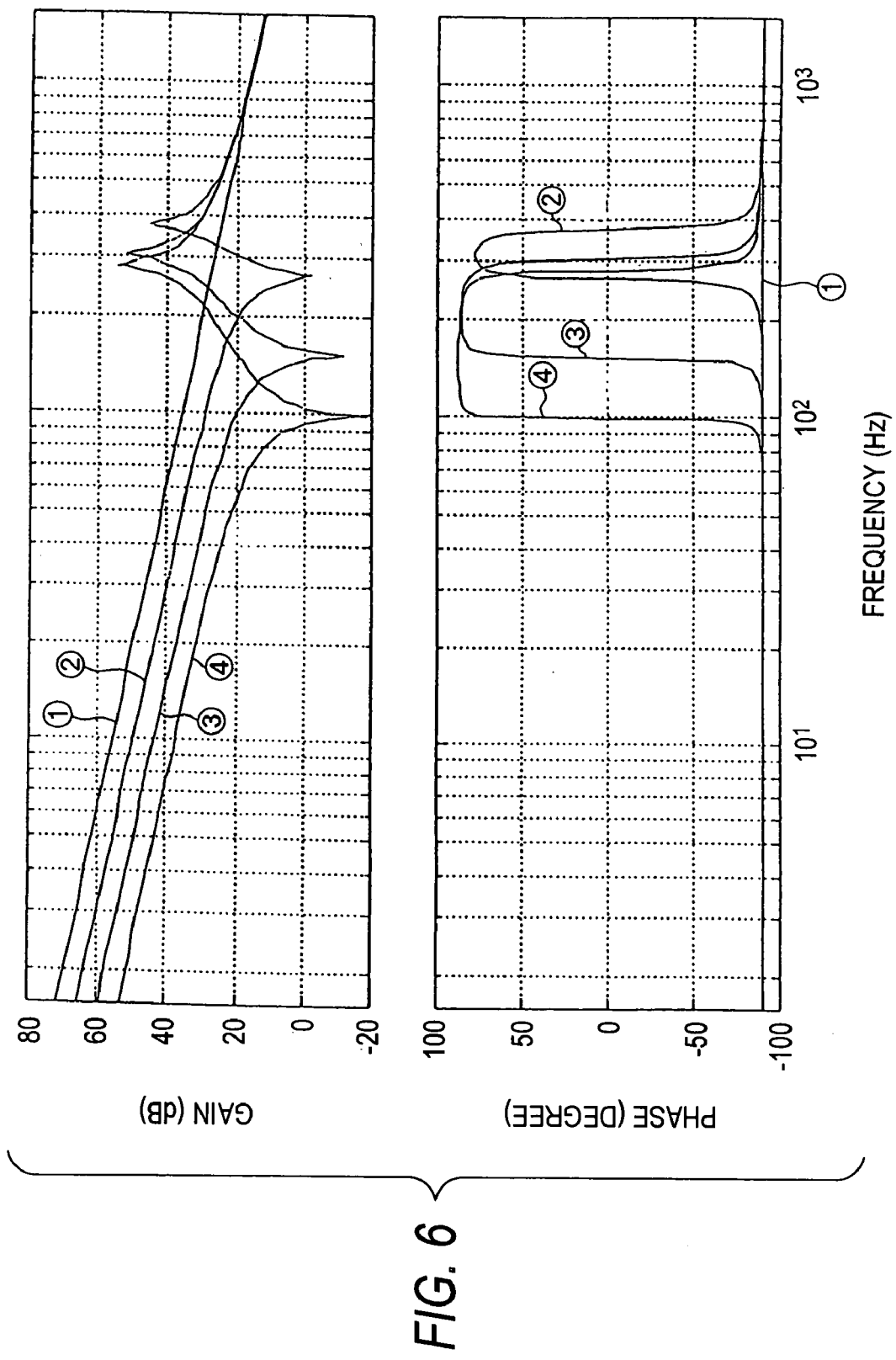
FIG. 6 is a view for describing an inertia identification method using the measurement result of a frequency response.

In FIG. 6, (1) is a board diagram obtained in the case of an individual motor. (2) shown in FIG. 6 is a board diagram designating a motor and a chassis section in the form of a two-inertia system and a case where the total amount of inertia of the motor and the chassis section is twice the inertia of the individual motor. (3) shown in FIG. 6 is a board diagram designating a case where the total amount of inertia is four times the inertia of the individual motor, and (4) shown in FIG. 6 is a board diagram designating a case where the total amount of inertia is eight times the inertia of the individual motor.

By reference to FIG. 6, the gain achieved in a low-frequency range of the gain diagram is understood to decrease by 6 dB as a result of the total amount of inertia having become double when compared with the gain achieved in the case of an individual motor. When the total amount of inertia has become four times, the gain is understood to drop by 12 dB. When the total amount of inertia has become eight times, the gain is understood to drop by 18 dB. From the foregoing results, the total amount of inertia consisting of inertia of the motor and that of the chassis section is understood to be able to be readily identified by comparing the frequency characteristic of the individual motor with the frequency characteristic achieved when the chassis section is connection to the motor. A relationship between the gain drop and the inertia should be calculated from the amount of gain drop=20 $\log_{10}$ (a total amount of inertia/inertia of an individual motor) (dB).

Specifically, the total amount of inertia consisting of inertia of the motor and inertia of the chassis section is identified by means of the following method.

Gains achieved at a plurality of frequencies of the frequency characteristic of the individual motor obtained by means of the controller model are compared with gains achieved at a plurality of frequencies of the frequency characteristic of a measured actual controller, thereby calculating differences between the gains at the respective frequencies. An average of the differences between the gains achieved at the respective frequencies is determined. If the average difference is −6 dB, the total amount of inertia is determined to be twice that of the individual motor. If the average difference is −12 dB, the total amount of inertia is determined to be four times that of the individual motor. Specifically, the total amount of inertia is calculated on the basis of the thus-calculated mean value by means of specifying the total amount of inertia, including the inertia of the chassis section, in terms of integral multiples of the inertia of the individual motor.

The frequency characteristic of the individual motor employed as the standard for identifying inertia may be measured while the motor is left alone by removing the chassis section from an actual motor controller without use of the model controller.

The low-frequency range at which gains are compared with each other may be lower than the resonance frequency and the antiresonant frequency. Specifically, there can be used a frequency band of, e.g., 50 Hz or less.

Under the method for identifying inertia according to the embodiment, the position command is fixed to a current position. Hence, inertia can be identified without modification of the position of the motor. Further, inertia can be readily identified from the thus-obtained frequency characteristic. Hence, there is no necessity for an independent device for identifying inertia.

The embodiment has described the invention by reference to a case where torque random is generated from a high-speed sweep waveform. However, the invention is not limited to such a case. The torque random may be generated from a maximum length code signal or the like.

As has been described, according to the embodiment, a frequency response can be measured without involvement of positional displacement while a torque command is not saturated. Hence, a frequency response can be measured accurately. Further, inertia can be identified by comparing a model frequency response with an actual frequency response through use of a controller model identical with the control system used for measuring a frequency response.

What is claimed is:

1. A motor controller comprising:
    a detector for detecting the position of a motor;
    a differentiator for calculating the speed of the motor from the position of the motor detected by the detector;

a command generation section which outputs a position command and produces an output by fixing the position command to a current position when a characteristic of a mechanism is measured;

a position control section which receives a position command output from the command generation section and performs position control operation by generating a speed command such that the position command matches the position of the motor;

a speed control section for performing speed control operation by generating such a torque command that the speed command coincides with the speed of the motor;

a torque filter section for subjecting the torque command to filtering;

a random signal generation section for generating and outputting torque random;

an adder which adds torque random generated by the random signal generation section to a torque command output from the torque filter section, thereby outputting the obtained signal as a new torque command;

a current control section which receives a torque command output from the adder, converts the torque command into a current command, and performs current control such that an electric current supplied to the motor coincides with the current command, thereby driving the motor; and a frequency response measurement section which receives a torque command output from the adder and a motor speed calculated by the differentiator and measures a frequency response.

2. The motor controller according to claim 1, wherein the torque random is a high-speed sweep waveform.

3. The motor controller according to claim 1, wherein the torque random is a maximum length code signal.

4. A mechanism characteristic measurement method for measuring a characteristic of a mechanism in a motor controller, the controller including a detector for detecting the position of a motor, a differentiator for calculating the speed of the motor from the position of the motor detected by the detector, an command generation section for outputting a position command, a position control section which receives a position command output from the command generation section and performs position control operation by generating a speed command such that the position command matches the position of the motor, a speed control section for performing speed control operation by generating such a torque command that the speed command coincides with the speed of the motor, a torque filter section for subjecting the torque command to filtering, and a current control section which receives a torque command output from the torque filter command, converts the torque command into a current command, and performs current control such that an electric current supplied to the motor coincides with the current command, thereby driving the motor, the method comprising:

a step of fixing a position command output from the command generation section to a current position;

a step of taking, as a new torque command, a signal formed by adding torque random to a torque command output from the torque filter section; and a step of measuring a frequency characteristic by receiving a torque command to which the torque random is added and a motor speed calculated by the differentiator.

5. The mechanism characteristic measurement method according to claim 4, further comprising a step of previously determining a frequency characteristic of an individual motor; and a step of calculating a total amount of inertia including inertia of a chassis section by comparing the frequency characteristic of the individual motor with the measured frequency characteristic.

6. The mechanism characteristic measurement method according to claim 5, wherein the step of calculating a total amount of inertia comprises:

a step of calculating differences between gains at respective frequencies by comparing gains achieved at a plurality of frequencies of the frequency characteristic of the individual motor with the gains achieved at a plurality of frequencies of the measured frequency characteristic;

a step of calculating a mean difference between the gains achieved at the respective frequencies; and a step of calculating the total amount of inertia on the basis of the calculated mean value, by means of specifying the total amount of inertia, including the inertia of the chassis section, in terms of integral multiples of the inertia of the individual motor.

7. The mechanism characteristic measurement method according to claim 5, wherein the frequency characteristic of the individual motor is measured through use of a controller model determined by simulation of the motor controller.

8. The mechanism characteristic measurement method according to claim 6, wherein the frequency characteristic of the individual motor is measured through use of a controller model determined by simulation of the motor controller.

9. The mechanism characteristic measurement method according to claim 5, wherein the frequency characteristic of the individual motor is measured while the chassis section is removed from the motor in the motor controller.

10. The mechanism characteristic measurement method according to claim 6, wherein the frequency characteristic of the individual motor is measured while the chassis section is removed from the motor in the motor controller.

11. The mechanism characteristic measurement method according to claim 4, wherein the torque random is a high-speed sweep waveform.

12. The mechanism characteristic measurement method according to claim 4, wherein the torque random is a maximum length code signal.

* * * * *